US011948764B2

(12) United States Patent
Kawaguchi et al.

(10) Patent No.: US 11,948,764 B2
(45) Date of Patent: Apr. 2, 2024

(54) ELECTROMAGNETIC RELAY

(71) Applicant: OMRON Corporation, Kyoto (JP)

(72) Inventors: Naoki Kawaguchi, Yame (JP); Ryota Minowa, Yamaga (JP); Hiroyuki Harimochi, Kumamoto (JP); Shinichi Ogawa, Kikuchi (JP); Kohei Otsuka, Omuta (JP); Hiroyuki Iwasaka, Kumamoto (JP)

(73) Assignee: OMRON CORPORATION, Kyoto (JP)

( * ) Notice: Subject to any disclaimer, the term of this patent is extended or adjusted under 35 U.S.C. 154(b) by 333 days.

(21) Appl. No.: 17/012,002

(22) Filed: Sep. 3, 2020

(65) Prior Publication Data

US 2021/0082646 A1 Mar. 18, 2021

(30) Foreign Application Priority Data

Sep. 13, 2019 (JP) ................................ 2019-167423

(51) Int. Cl.
*H01H 3/00* (2006.01)
*H01H 47/00* (2006.01)
(Continued)

(52) U.S. Cl.
CPC .......... *H01H 47/22* (2013.01); *H01H 47/002* (2013.01); *H01H 50/54* (2013.01)

(58) Field of Classification Search
CPC ...... H01H 47/22; H01H 47/002; H01H 50/54; H01H 2047/008; H01H 47/325; H01H 47/02; H01F 2007/1894
(Continued)

(56) References Cited

U.S. PATENT DOCUMENTS 4,878,147 A 10/1989 Oyama et al.
5,907,252 A 5/1999 Hayakawa et al.
(Continued)

FOREIGN PATENT DOCUMENTS

JP 53-120751 U 9/1978
JP 56-121232 A 9/1981
(Continued)

OTHER PUBLICATIONS

The Office Action for the corresponding Japanese application No. 2019-167423, dated Apr. 4, 2023.

*Primary Examiner* — Mohamad A Musleh
*Assistant Examiner* — Lisa N Homza
(74) *Attorney, Agent, or Firm* — SHINJYU GLOBAL IP

(57) ABSTRACT

The electromagnetic relay includes a fixed terminal, a fixed contact connected to the fixed terminal, a movable contact piece moving in an opening direction and a closing direction with respect to the fixed terminal, a movable contact connected to the movable contact piece and being arranged to face the fixed contact, a coil generating an electromagnetic force to move the movable contact piece, and a drive circuit controlling a current to the coil. The drive circuit increases the current at a first increase rate in a first period that includes a period from a start time when the current starts to flow in the coil to before a contact time point at which the movable contact contacts the fixed contact. The drive circuit increases the current at a second increase rate larger than the first increase rate in the second period that includes a period after the contact time point.

8 Claims, 5 Drawing Sheets

(51) Int. Cl.
*H01H 47/22* (2006.01)
*H01H 50/54* (2006.01)

(58) Field of Classification Search
USPC .......................................................... 335/185
See application file for complete search history.

(56) References Cited

U.S. PATENT DOCUMENTS

| | | | | |
|---|---|---|---|---|
| 10,262,824 | B2 * | 4/2019 | Matsuo | H01H 47/223 |
| 2009/0322453 | A1 * | 12/2009 | Kawaguchi | H01H 50/20<br>335/81 |
| 2009/0322454 | A1 * | 12/2009 | Tanaka | H01H 50/38<br>335/189 |
| 2009/0322455 | A1 * | 12/2009 | Yoshihara | H01H 50/36<br>335/189 |
| 2011/0221548 | A1 * | 9/2011 | Yoshihara | H01H 51/29<br>335/185 |
| 2013/0106542 | A1 * | 5/2013 | Yano | H01H 9/443<br>335/185 |
| 2015/0123753 | A1 * | 5/2015 | Kawaguchi | H01H 50/20<br>335/203 |
| 2015/0187527 | A1 * | 7/2015 | Kubono | H01H 50/042<br>335/189 |
| 2015/0204946 | A1 * | 7/2015 | Kinoshita | H01H 47/002<br>324/421 |
| 2015/0213980 | A1 * | 7/2015 | Lee | H01H 50/10<br>335/185 |

FOREIGN PATENT DOCUMENTS

| | | |
|---|---|---|
| JP | 01-132108 A | 5/1989 |
| JP | 10-154452 A | 6/1998 |

* cited by examiner

ELECTROMAGNETIC RELAY

CROSS-REFERENCE TO RELATED APPLICATION

This application claims priority to Japanese Patent Application No. 2019-167423, filed Sep. 13, 2019. The contents of that application are incorporated by reference herein in their entirety.

FIELD

The present invention relates to an electromagnetic relay.

BACKGROUND

There is known an electromagnetic relay that reduces power consumption during contact holding by reducing current to the coil after the contact comes into contact. For example, in the electromagnetic relay disclosed in Japanese Laid-Open Patent Application No. H1-132108, the coil voltage is controlled by PWM (Pulse Width Modulation) control. Specifically, the duty ratio of the coil voltage is set to 100% from the start of driving the contact until the contact comes into contact. The duty ratio is reduced during contact holding. This reduces the current to the coil during contact holding.

SUMMARY

In the above-mentioned electromagnetic relay, a large current flows in the coil before contact comes into contact. Therefore, the collision energy of the contact becomes large, and the bounce at the time when the contact comes into contact therefore becomes large. An object of the present disclosure is to reduce the bounce at the time when the contact comes into contact in the electromagnetic relay.

An electromagnetic relay according to an aspect includes a fixed terminal, a fixed contact, a movable contact piece, a movable contact, a coil, and a drive circuit. The fixed contact is connected to the fixed terminal. The movable contact piece is configured to move in an opening direction and a closing direction with respect to the fixed terminal. The movable contact is connected to the movable contact piece and is arranged to face the fixed contact. The coil generates an electromagnetic force to move the movable contact piece. The drive circuit controls a current to the coil. The drive circuit increases the current at a first increase rate in a first period. The first period includes a period from a start time when the current starts to flow in the coil to before a contact time point at which the movable contact contacts the fixed contact. The drive circuit increases the current at a second increase rate larger than the first increase rate in a second period. The second period includes a period after the contact time point.

In the electromagnetic relay according to this aspect, the current flows in the coil in the first period at an increase rate smaller than that in the second period. Therefore, the collision energy of the contact is reduced. This reduces the bounce of the contact. Further, in the second period, the current flows in the coil at an increase rate larger than that in the first period. Therefore, the pressing force of the movable contact against the fixed contact increases. This further reduces the bounce of the contact.

The driving circuit may hold the current to the coil at a current value larger than a current value during the first period, in the third period after the second period. In this case, the bounce of the contact can be quickly converged and the contacts can be brought into stable contact with each other.

The drive circuit may reduce the current to the coil to a current value smaller than the current value in the third period, in the fourth period after the third period. In this case, the power consumption is reduced during the contact being hold.

The first period may be longer than the second period. In this case, the collision energy of the contact can be reduced because the current to the coil is slowly increased.

The electromagnetic relay may further include a contact voltage detection unit. The contact voltage detection unit may detect a voltage at the movable contact and the fixed contact. The drive circuit may detect the contact time point based on the voltage detected by the contact voltage detection unit. In this case, the contact of the contact can be accurately detected based on the voltage at the movable contact.

The drive circuit may start the second period based on the voltage detected by the contact voltage detection unit. In this case, it is possible to appropriately start the second period according to the contact time point of the contact.

The electromagnetic relay may further include a movable mechanism and a movable iron core. The movable mechanism may be connected to the movable contact piece. The movable iron core may be connected to the movable mechanism and may be moved by the electromagnetic force generated from the coil. The first period may include a period from the start time to a time when the movable iron core starts to move. In this case, the collision energy of the contact can be reduced by slowly increasing the current to the coil until the movable iron core starts to move.

DETAILED DESCRIPTION

Figure 1:
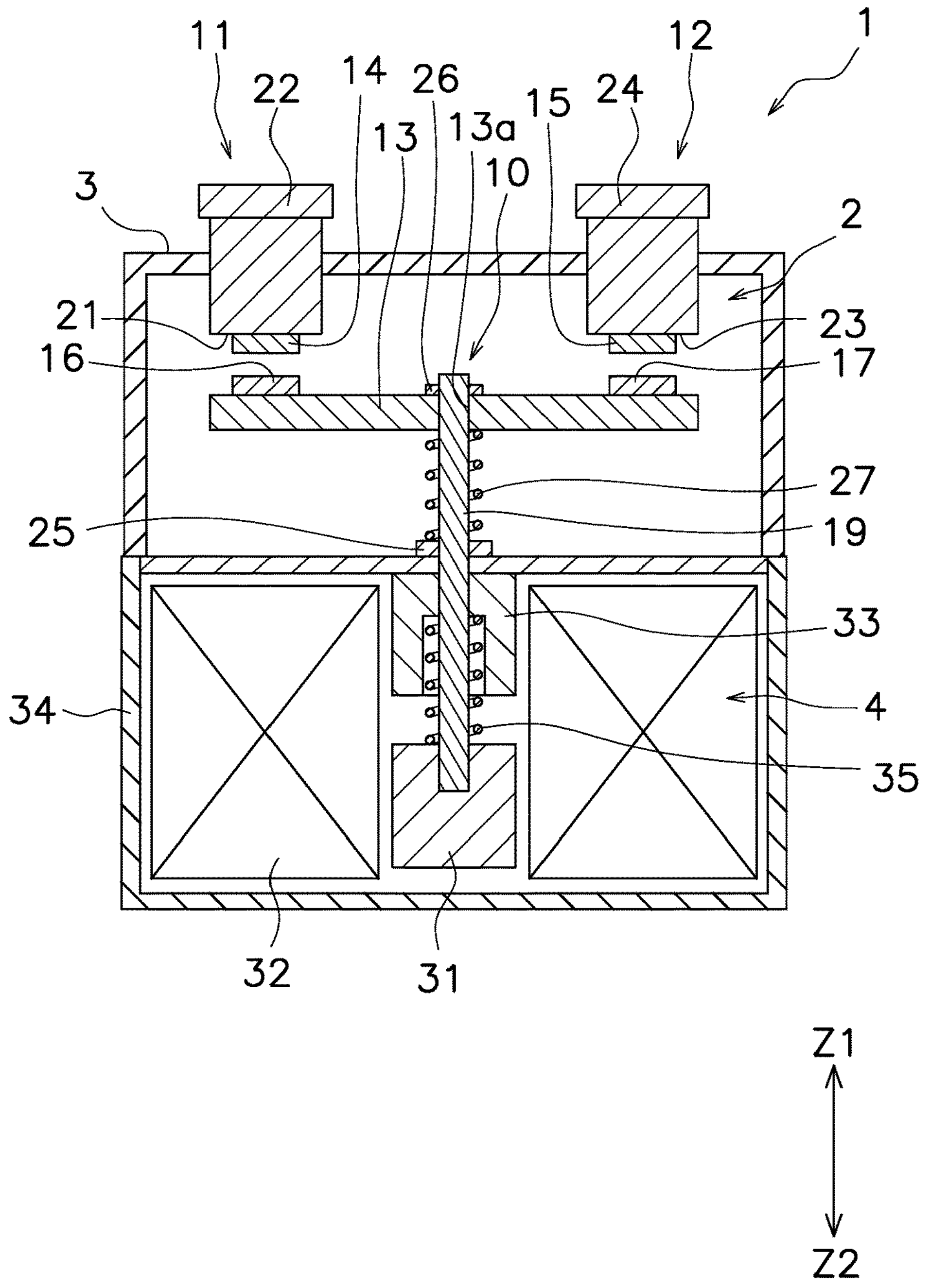
FIG. 1 is a side sectional view showing an electromagnetic relay according to an embodiment in an opened state.

Hereinafter, an electromagnetic relay 1 according to an embodiment will be described with reference to the drawings. FIG. 1 is a side sectional view showing the electromagnetic relay 1 according to an embodiment. As illustrated in FIG. 1, the electromagnetic relay 1 includes a contact device 2, a housing 3, and a drive device 4.

In the following description, directions up, down, left, and right respectively mean the directions up, down, left, and right in FIG. 1. Specifically, the direction from the drive device 4 to the contact device 2 is defined as the up direction. The direction from the contact device 2 to the drive device 4 is defined as the down direction. In FIG. 1, the direction intersecting with the up-down direction is defined as the left-right direction. The direction intersecting the up-down direction and the left-right direction is defined as the front-back direction. The front-back direction is a direction perpendicular to the paper surface of FIG. 1. However, these directions are defined for convenience of description, and do not limit the arrangement direction of the electromagnetic relay 1.

The contact device 2 is arranged in the housing 3. The contact device 2 includes a movable mechanism 10, a first fixed terminal 11, a second fixed terminal 12, a movable contact piece 13, a first fixed contact 14, a second fixed contact 15, a first movable contact 16, and a second movable contact 17. The first fixed terminal 11 and the second fixed terminal 12 are made of conductive material such as copper or copper alloy. The first fixed contact 14 is connected to the first fixed terminal 11. The second fixed contact 15 is connected to the second fixed terminal 12. The first fixed contact 14 and the second fixed contact 15 are arranged apart from each other in the left-right direction.

The first fixed terminal 11 includes a first contact support portion 21 and a first external terminal portion 22. The first contact support portion 21 faces the movable contact piece 13. The first fixed contact 14 is connected to the first contact support portion 21. The first external terminal portion 22 is connected to the first contact support portion 21. The first external terminal portion 22 projects outward from the housing 3.

The second fixed terminal 12 includes a second contact support portion 23 and a second external terminal portion 24. The second contact support portion 23 faces the movable contact piece 13. The second fixed contact 15 is connected to the second contact support portion 23. The second external terminal portion 24 is connected to the second contact support portion 23. The second external terminal portion 24 projects outward from the housing 3. Specifically, the first external terminal portion 22 and the second external terminal portion 24 project upward from the housing 3.

The movable contact piece 13 extends in the left-right direction. The movable contact piece 13 is arranged so as to face the first contact support portion 21 of the first fixed terminal 11 and the second contact support portion 23 of the second fixed terminal 12 in the up-down direction. The movable contact piece 13 is arranged so as to be movable in the closing direction Z1 and the opening direction Z2. The closing direction Z1 is a direction in which the movable contact piece 13 approaches the first fixed terminal 11 and the second fixed terminal 12. The closing direction Z1 is upward in FIG. 1. The opening direction Z2 is a direction in which the movable contact piece 13 is separated from the first fixed terminal 11 and the second fixed terminal 12. The opening direction Z2 is downward in FIG. 1.

The first movable contact 16 and the second movable contact 17 are connected to the movable contact piece 13. The first movable contact 16 and the second movable contact 17 are arranged apart from each other in the left-right direction. The first movable contact 16 faces the first fixed contact 14 in the up-down direction. The second movable contact 17 faces the second fixed contact 15 in the up-down direction.

The movable mechanism 10 supports the movable contact piece 13. The movable mechanism 10 is arranged so as to be movable in the closing direction Z1 and the opening direction Z2 together with the movable contact piece 13. The movable mechanism 10 includes a drive shaft 19, a first holding member 25, a second holding member 26, and a contact spring 27. The drive shaft 19 extends in the up-down direction. The drive shaft 19 is connected to the movable contact piece 13. The drive shaft 19 extends downward from the movable contact piece 13. The movable contact piece 13 is provided with a hole 13*a*. The drive shaft 19 is inserted in the hole 13*a*. The movable contact piece 13 is movable relative to the drive shaft 19 in the closing direction Z1 and the opening direction Z2.

Figure 2:
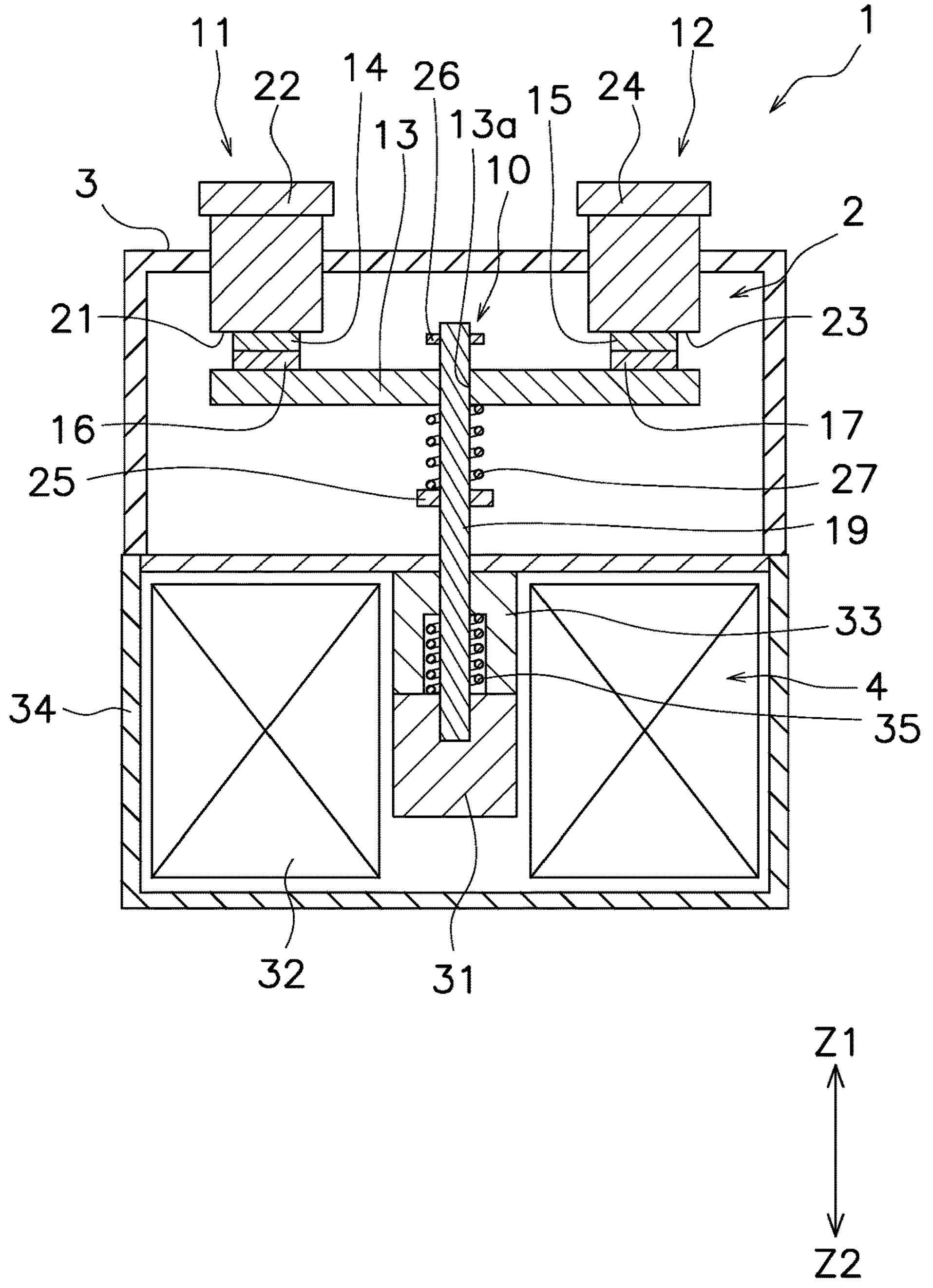
FIG. 2 is a side sectional view showing the electromagnetic relay in a closed state.
Figure 3:
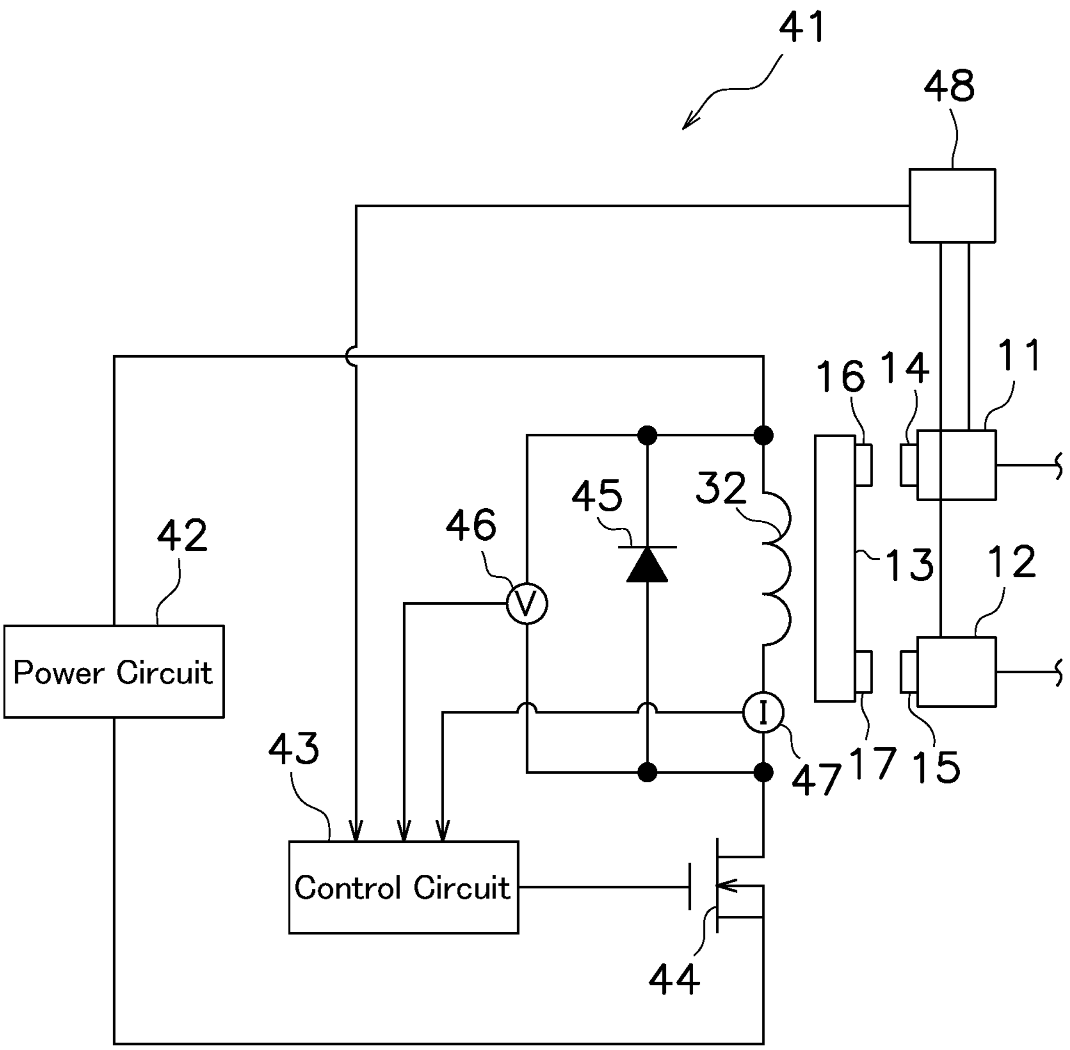
FIG. 3 is a schematic diagram which shows a structure of a drive circuit.

The drive shaft 19 is provided so as to be movable between a closed position and an open position. FIG. 1 shows the drive shaft 19 in the open position. As illustrated in FIG. 1, when the drive shaft 19 is in the open position, the movable contacts 16 and 17 are separated from the fixed contacts 14 and 15. FIG. 2 shows the drive shaft 19 in the closed position. As illustrated in FIG. 2, when the drive shaft 19 is in the closed position, the movable contacts 16 and 17 are in contact with the fixed contacts 14 and 15.

The first holding member 25 is fixed to the drive shaft 19. The contact spring 27 is arranged between the movable contact piece 13 and the first holding member 25. The contact spring 27 biases the movable contact piece 13 in the closing direction Z1 while the movable contacts 16 and 17 are in contact with the fixed contacts 14 and 15. The second holding member 26 is fixed to the drive shaft 19. The movable contact piece 13 is located between the second holding member 26 and the contact spring 27.

The drive device 4 operates the movable contact piece 13 by an electromagnetic force. The drive device 4 moves the movable mechanism 10 in the closing direction Z1 and the opening direction Z2. Thereby, the drive device 4 moves the movable contact piece 13 in the closing direction Z1 and the opening direction Z2. The drive device 4 includes a movable iron core 31, a coil 32, a fixed iron core 33, a yoke 34, and a return spring 35.

The movable iron core 31 is connected to the drive shaft 19. The movable iron core 31 is provided so as to be movable in the closing direction Z1 and the opening direction Z2. The coil 32 is energized to generate an electromagnetic force that moves the movable iron core 31 in the closing direction Z1. The fixed iron core 33 is arranged to face the movable iron core 31. The return spring 35 is arranged between the movable iron core 31 and the fixed iron core 33. The return spring 35 biases the movable iron core 31 in the opening direction Z2.

The yoke 34 is arranged so as to surround the coil 32. The yoke 34 is arranged on the magnetic circuit formed by the coil 32. The yoke 34 is arranged above the coil 32, on the side of the coil 32, and below the coil 32.

Next, the operation of the electromagnetic relay 1 will be described. When the coil 32 is not energized, the drive device 4 is not excited. In this case, the drive shaft 19 is pressed in the opening direction Z2 by the elastic force of the return spring 35 together with the movable iron core 31. Therefore, the drive shaft 19 is located at the open position illustrated in FIG. 1. In this state, the movable contact piece 13 is also pressed in the opening direction Z2 via the movable mechanism 10. Therefore, when the drive shaft 19 is in the open position, the first movable contact 16 and the second movable contact 17 are separated from the first fixed contact 14 and the second fixed contact 15.

When the coil 32 is energized, the drive device 4 is excited. In this case, the electromagnetic force of the coil 32 causes the movable iron core 31 to move in the closing direction Z1 against the elastic force of the return spring 35. Accordingly, both the drive shaft 19 and the movable contact piece 13 move in the closing direction Z1. Therefore, as illustrated in FIG. 2, the drive shaft 19 moves to the closed position. As a result, as illustrated in FIG. 2, when the drive shaft 19 is in the closed position, the first movable contact 16 and the second movable contact 17 contact the first fixed contact 14 and the second fixed contact 15, respectively.

When the current to the coil 32 is stopped and demagnetized, the movable iron core 31 is pressed in the opening direction Z2 by the elastic force of the return spring 35. Accordingly, both the drive shaft 19 and the movable contact piece 13 move in the opening direction Z2. Therefore, as illustrated in FIG. 1, the movable mechanism 10 moves to the open position. As a result, when the movable mechanism 10 is in the open position, the first movable contact 16 and the second movable contact 17 are separated from the first fixed contact 14 and the second fixed contact 15.

The control of the current to the coil 32 as described above is performed by the drive circuit 41 illustrated in FIG. 1. The electromagnetic relay 1 includes a drive circuit 41. The drive circuit 41 switches the electromagnetic relay 1 between an open state and a closed state according to a control signal from the outside. The drive circuit 41 controls the coil current and the coil voltage supplied to the coil 32. Specifically, the drive circuit 41 controls the coil voltage by PWM (Pulse Width Modulation) control.

The drive circuit 41 includes a power circuit 42, a control circuit 43, a switching circuit 44, a reflux circuit 45, a coil voltage sensor 46, a coil current sensor 47, and a contact voltage detection unit 48. The power circuit 42 is connected to an external power supply not illustrated. The power circuit 42 includes, for example, a switch. The power circuit 42 is controlled by a control signal from the outside and switches on/off of electric power to the drive circuit 41.

The control circuit 43 includes, for example, a processor. The control circuit 43 outputs a pulse signal to the switching circuit 44. The switching circuit 44 includes a semiconductor switching element such as a MOS-FET (Metal Oxide Semiconductor-Field Effect Transistor). The switching circuit 44 switches on/off of the voltage input from the power circuit 42 to the coil 32 according to the pulse signal from the control circuit 43.

The reflux circuit 45 is connected to the coil 32 in parallel. The reflux circuit 45 includes, for example, a diode element. The coil voltage sensor 46 detects a coil voltage. The coil voltage sensor 46 inputs a signal indicating the coil voltage to the control circuit 43. The coil current sensor 47 detects a coil current. The coil current sensor 47 inputs a signal indicating the coil current to the control circuit 43. The contact voltage detection unit 48 detects a contact voltage. The contact voltage is the voltage between the contacts 14-17. The contact voltage detection unit 48 is, for example, a voltage sensor. However, the contact voltage detection unit 48 may be another detection device such as a photocoupler. The contact voltage detection unit 48 inputs a signal indicating the contact voltage to the control circuit 43.

Figures 4A, 4B, 4C, 4D:
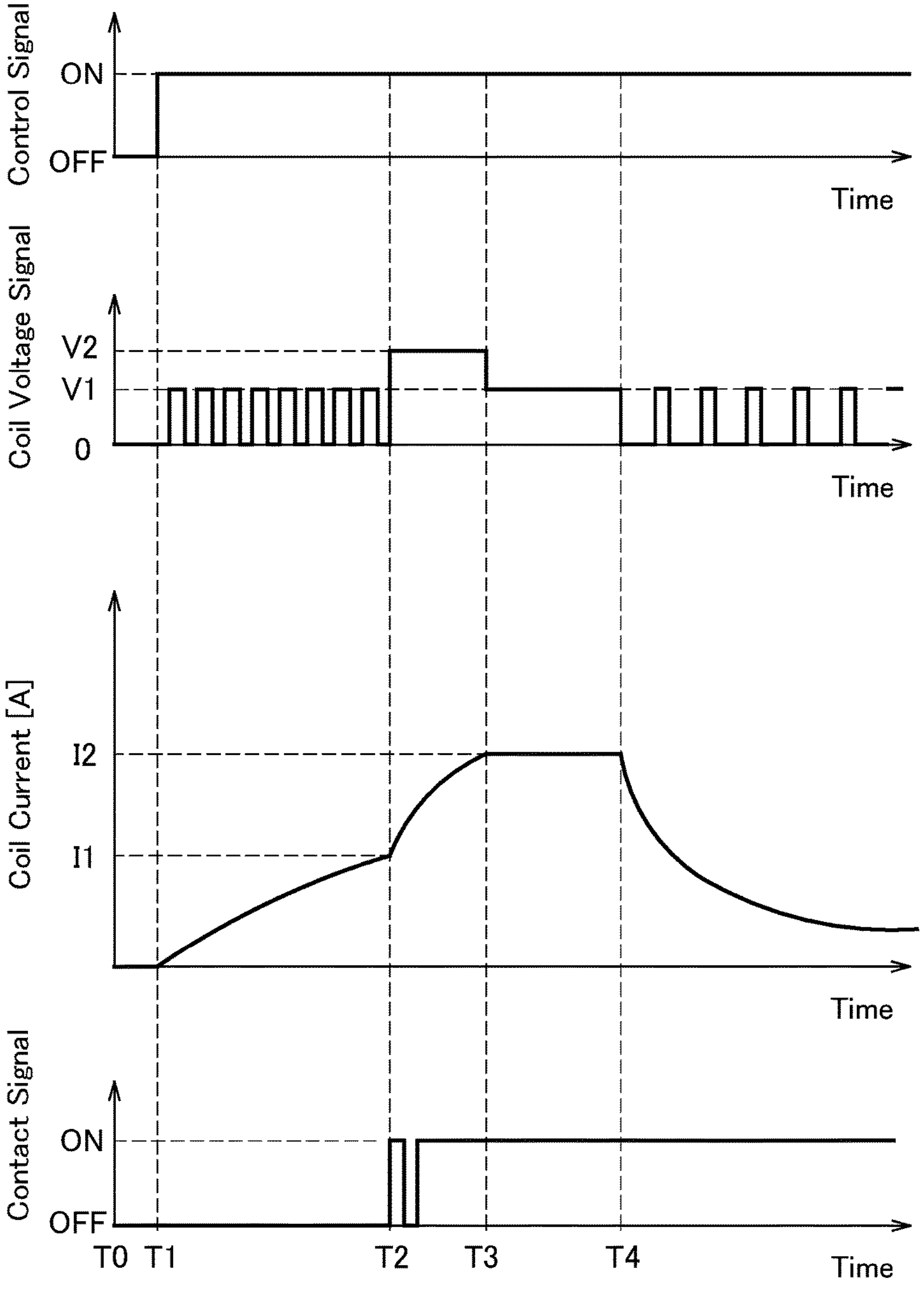
FIGS. 4A-4D show a timing chart illustrating control of the electromagnetic relay by the drive circuit.

FIGS. 4A-4D show a timing chart illustrating the control of the electromagnetic relay 1 by the drive circuit 41. FIG. 4A shows the control signal from the outside. When the control signal indicates off, the electromagnetic relay 1 is in the open state. When the control signal indicates on, the electromagnetic relay 1 is in the closed state. FIG. 4B shows the coil voltage signal. The coil voltage signal indicates the coil voltage. FIG. 4C shows the coil current. FIG. 4D shows a contact signal. The contact signal indicates the contact voltage. When the electromagnetic relay 1 is in the open state, the contact signal indicates off. When the electromagnetic relay 1 is in the closed state, the contact signal indicates on.

At time T0, the control signal is off. Therefore, the drive circuit 41 does not apply a voltage to the coil 32, and no current flows in the coil 32. Therefore, the electromagnetic relay 1 is in the open state, and the contact signal indicates off.

When the control signal is turned on at time T1, the drive circuit 41 applies the coil voltage signal having the voltage value V1 and the duty ratio A1 to the coil 32 in the first period T1-T2. The duty ratio A1 is smaller than 100%. Accordingly, a current starts to flow in the coil 32 from the time T1, and the coil current increases at the first increase rate in the first period T1-T2. The increase rate of the coil current indicates the increase amount of the current per unit time. Therefore, the first increase rate indicates the inclination of the coil current in the first period T1-T2 in FIG. 4C.

In the first period T1-T2, the drive device 4 is excited by energizing the coil 32. As a result, in the first period T1-T2, the movable iron core 31 starts to move in the closing direction Z1, and the movable contacts 16 and 17 move in the closing direction Z1. At time T2, the movable contacts 16 and 17 contact the fixed contacts 14 and 15. The drive circuit 41 detects the contact of the contacts 14-17 based on the contact voltage detected by the coil voltage sensor 46. At this time, the coil current has a current value I1.

When the drive circuit 41 detects the contact of the contacts 14-17, the drive circuit 41 applies the coil voltage signal having the voltage value V2 and the duty ratio A2 to the coil 32 in the second period T2-T3. The duty ratio A2 is larger than the duty ratio A1. For example, the duty ratio A2 is 100%. However, the duty ratio A2 may be smaller than 100%. The voltage value V2 is larger than the voltage value V1. As a result, the coil current increases at the second increase rate in the second period T2-T3. The second increase rate is larger than the first increase rate. The second period T2-T3 is shorter than the first period T1-T2. That is, the first period T1-T2 is longer than the second period T2-T3.

When the coil current reaches the current value I2 at time T3, the drive circuit 41 reduces the coil voltage to the voltage value V1. The drive circuit 41 holds the coil voltage at the voltage value V1 in the third period T3-T4. The drive circuit 41 applies the coil voltage signal having the voltage value V1 and the duty ratio A3 to the coil 32 in the third period T3-T4. The duty ratio A3 is larger than the duty ratio A1. The duty ratio A3 is 100%, for example. However, the duty ratio A3 may be smaller than 100%.

In the third period T3-T4, the coil current is held at the current value I2. The current value I2 is larger than the current value I1. As described above, in the second period T2-T3 and the third period T3-T4, the coil current rapidly rises and is held at the large current value I2 so that the pressing force of the movable contacts 16 and 17 against the fixed contacts 14 and 15 increases. This reduces the bounce of the movable contacts 16 and 17 in the second period T2-T3 and the third period T3-T4.

When a predetermined time has elapsed from the time T3, the drive circuit 41 applies the coil voltage signal having the voltage value V1 and the duty ratio A4 to the coil 32 in the fourth period after the time T4. The duty ratio A4 is smaller than 100%. The duty ratio A4 is smaller than the duty ratio A1. This reduces the power consumption while the contacts 14-17 are held in the closed state.

In the electromagnetic relay 1 according to the present embodiment described above, the current flows in the coil 32 in the first period T1-T2 at an increase rate smaller than that in the second period T2-T3. Therefore, the collision energy of the contacts 14-17 is reduced. This reduces the bounce of the contact. In addition, in the second period T2-T3, the current flows in the coil 32 at an increase rate larger than that in the first period T1-T2. Therefore, the pressing force of the movable contacts 16 and 17 against the fixed contacts 14 and 15 increases. This further reduces the bounce of the contact. Moreover, the collision noise at the time of contacting the contact is reduced.

Although an embodiment of the present invention is described above, the present invention is not limited to the above embodiment, and various modifications can be made without departing from the scope of the invention.

In the above-described embodiment, the drive device 4 pushes the drive shaft 19 from the side of the drive device 4 so that the movable contact piece 13 moves in the closing direction Z1. Further, when the drive device 4 pulls the drive shaft 19 to the side of the drive device 4, the movable contact piece 13 moves in the opening direction Z2. However, the operation directions of the drive shaft 19 for opening and closing the contact may be opposite to those in the above-described embodiment. That is, the movable contact piece 13 may move in the closing direction Z1 when the drive device 4 pulls the drive shaft 19 to the side of the drive device 4. The movable contact piece 13 may be moved in the opening direction Z2 when the drive device 4 pushes the drive shaft 19 from the side of the drive device 4. That is, the closing direction Z1 and the opening direction Z2 may be opposite to those in the above embodiment.

Figure 5:
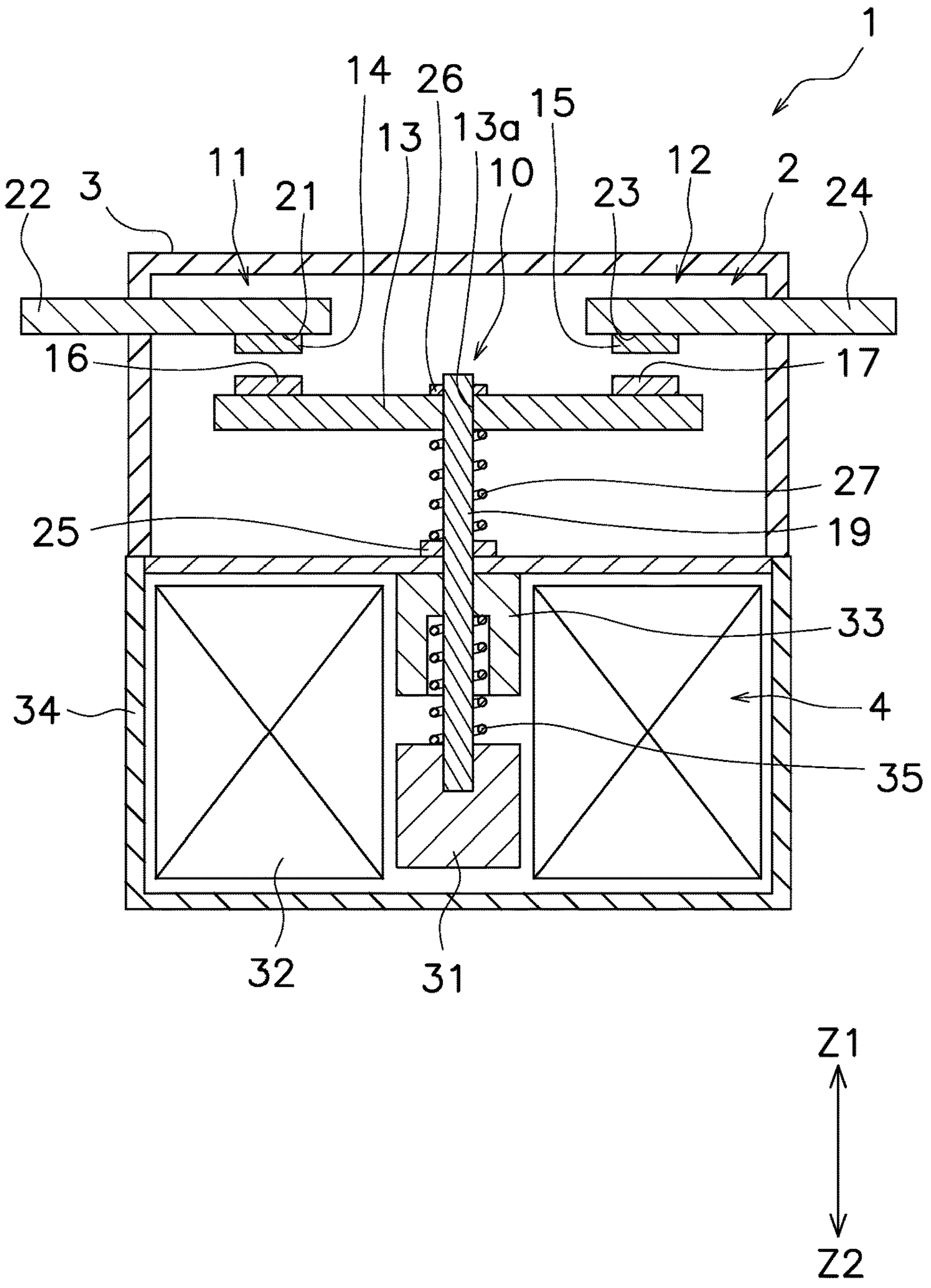
FIG. 5 is a side sectional view showing the electromagnetic relay according to a modification.

The shape or arrangement of the first fixed terminal 11, the second fixed terminal 12, or the movable contact piece 13 may be changed. For example, as illustrated in FIG. 5, the first external terminal portion 22 and the second external terminal portion 24 may project from the housing 3 in the left-right direction. Alternatively, the first external terminal portion 22 and the second external terminal portion 24 may project from the housing 3 in the front-rear direction. The shape or arrangement of the movable iron core 31, the coil 32, the fixed iron core 33, or the yoke 34 may be changed. The shape or the arrangement of the first fixed contact 14, the second fixed contact 15, the first movable contact 16, and the second movable contact 17 may be changed.

The first fixed contact 14 may be separate from the first fixed terminal 11, or may be an integral body with the first fixed terminal 11. The second fixed contact 15 may be separate from the second fixed terminal 12, or may be an integral body with the second fixed terminal 12. The first movable contact 16 may be separate from the movable contact piece 13, or may be an integral body with the movable contact piece 13. The second movable contact 17 may be separate body from the movable contact piece 13, or may be an integral body with the movable contact piece 13.

The configuration of the drive circuit 41 is not limited to that of the above embodiment, and may be changed. The drive circuit 41 may be a known circuit for performing PWM control. The contact voltage detection unit 48 may be omitted. In the above embodiment, the drive circuit 41 changes the increase rate of the coil current from the first increase rate to the second increase rate when the contact of the contacts 14-17 is detected. However, the drive circuit 41 may measure the elapsed time from the time T1 and change the increase rate of the coil current from the first increase rate to the second increase rate when a predetermined time has passed from the time T1. In this case, the first period may be a period from time T1 to before the contact time point of the contacts 14-17.

REFERENCE SIGNS LIST

10 Movable mechanism
11 First fixed terminal
13 Moving contact piece
14 First fixed contact
16 First movable contact
31 Movable iron core
32 Coil
41 Drive circuit
48 Contact voltage detection unit

The invention claimed is:

1. An electromagnetic relay, comprising:
a fixed terminal;
a fixed contact connected to the fixed terminal;
a movable contact piece configured to move in an opening direction and a closing direction with respect to the fixed terminal;
a movable contact connected to the movable contact piece and arranged to face the fixed contact;
a coil configured to generate an electromagnetic force to move the movable contact piece; and
a drive circuit configured to control a current to the coil, wherein
the drive circuit is configured 1) to increase the current at a first increase rate in a first period prior to the movable contact contacting the fixed contact, the first period beginning when the current starts to flow in the coil; 2) in a second period subsequent to the movable contact contacting the fixed contact, to increase the current at a second increase rate that is larger than the first increase rate; and 3) in a third period subsequent to the second period, to maintain the current to the coil at a current value larger than a current value during the first period.

2. The electromagnetic relay according to claim 1, wherein the drive circuit is configured to reduce the current to the coil in a fourth period, subsequent to the third period, to a current value smaller than the current value in the third period.

3. The electromagnetic relay according to claim 1, wherein the first period is longer than the second period.

4. The electromagnetic relay according to claim 1, further comprising a contact voltage detection unit configured to detect a voltage at the movable contact and the fixed contact,
wherein the drive circuit is configured to detect the movable contact contacting the fixed contact based on the voltage detected by the contact voltage detection unit.

5. The electromagnetic relay according to claim 4, wherein the drive circuit starts the second period based on the voltage detected by the contact voltage detection unit.

6. The electromagnetic relay according to claim 1, further comprising
a movable mechanism connected to the movable contact piece; and
a movable iron core connected to the movable mechanism and configured to be moved by the electromagnetic force generated from the coil,
wherein the first period includes a period from the time at which the current starts to flow in the coil to a time when the movable iron core starts to move.

7. An electromagnetic relay, comprising:
a fixed terminal;
a fixed contact connected to the fixed terminal;
a movable contact piece configured to move in an opening direction and a closing direction with respect to the fixed terminal;
a movable contact connected to the movable contact piece and arranged to face the fixed contact;
a coil configured to generate an electromagnetic force to move the movable contact piece;

a drive circuit configured to control a current to the coil; and a contact voltage detection unit configured to detect a voltage at the movable contact and the fixed contact, wherein the drive circuit is configured 1) to increase the current at a first increase rate in a first period prior to the movable contact contacting the fixed contact, the first period beginning when the current starts to flow in the coil; and 2) in a second period subsequent to the movable contact contacting the fixed contact, to increase the current at a second increase rate that is larger than the first increase rate, the drive circuit further being configured to detect the movable contact contacting the fixed contact as part of a transition from the first period to the second period based on the voltage detected by the contact voltage detection unit.

8. The electromagnetic relay according to claim 7, wherein the drive circuit starts the second period based on the voltage detected by the contact voltage detection unit.

* * * * *